T. E. BLOYD.
COLLAPSIBLE CRATE.
APPLICATION FILED SEPT. 11, 1915.
1,167,621.
Patented Jan. 11, 1916.
2 SHEETS—SHEET 2.
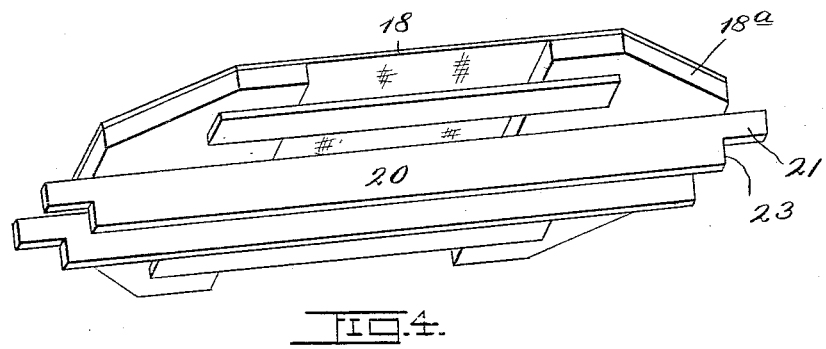
FIG. 4.
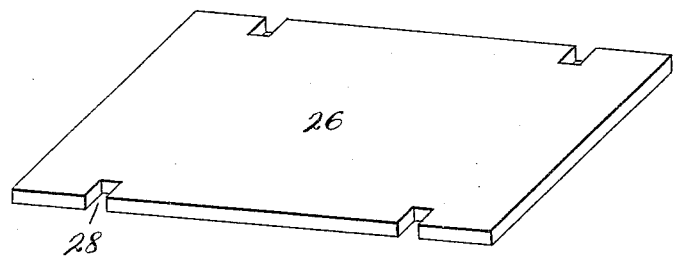
FIG. 5.
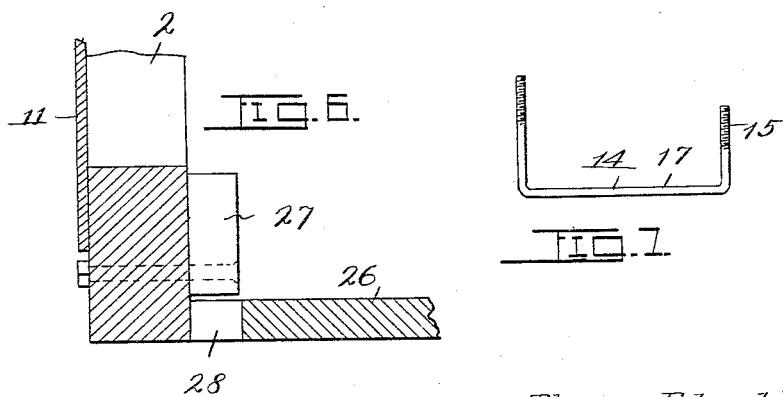
FIG. 6.
FIG. 7.
Witnesses
Fred P. Fischer
L. J. Fischer
Inventor:
Thomas Edward Bloyd,
By F. G. Fischer
Attorney

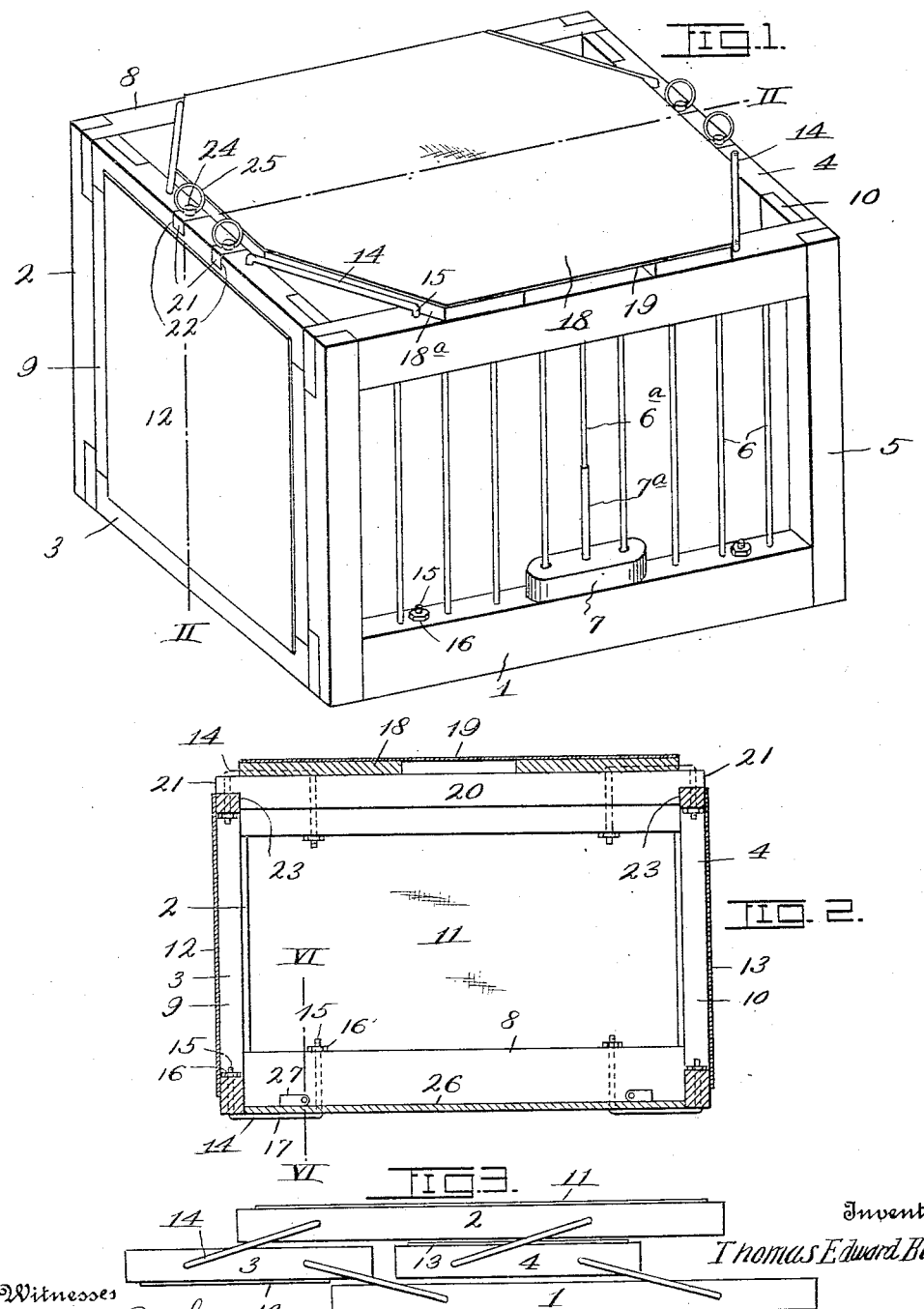

UNITED STATES PATENT OFFICE.

THOMAS EDWARD BLOYD, OF LEAVENWORTH, KANSAS.

COLLAPSIBLE CRATE.

1,167,621.  Specification of Letters Patent.  Patented Jan. 11, 1916.

Application filed September 11, 1915. Serial No. 50,234.

*To all whom it may concern:*

Be it known that I, THOMAS EDWARD BLOYD, a citizen of the United States, residing at Leavenworth, in the county of Leavenworth and State of Kansas, have invented certain new and useful Improvements in Collapsible Crates, of which the following is a specification.

My invention relates to improvements in collapsible crates, and one object of the invention is to provide a crate of this character, which, while susceptible of general use, is particularly adapted for exhibition purposes in displaying fine poultry, dogs, and similar stock.

A further object is to provide a crate of simple and economical construction; which can be quickly set up for use or folded into compact form for storage and shipment; which enables inspection of its contents without removal of any of its parts; and which is substantial when set up for use.

In order that the invention may be fully understood, reference will now be made to the accompanying drawings, in which:

Figure 1 is a perspective view of the crate set up for use. Fig. 2 is a vertical section on line II—II of Fig. 1. Fig. 3 is a side elevation of a crate in collapsed condition. Fig. 4 is a detail perspective of the top of the crate. Fig. 5 is a detail perspective of the bottom of the crate. Fig. 6 is a broken section, enlarged, on line VI—VI of Fig. 2, with the turn-buttons disclosed thereby adjusted to a vertical position. Fig. 7 is a detail of one of the hinges employed in carrying out the invention.

Referring now in detail to the different parts, 1 designates the front wall, 2 the rear wall, and 3 and 4 the end walls of the crate. The ends of the walls 3 and 4 fit between the front and rear walls, as disclosed by Fig. 1.

The front wall 1 in the present instance, comprises a rectangular frame 5 and vertical rods 6, through which latter the contents of the crate can be readily inspected. The central rod 6ª is shorter than its companions to provide a doorway which is normally closed by a door 7, vertically slidable on two of the rods 6 and provided with a sleeve 7ª slidable on the short rod 6ª.

The walls 2, 3 and 4 consist of rectangular frames 8, 9 and 10, covered in the present instance with canvas 11, 12 and 13, respectively, although poultry wire or other suitable material may be substituted for said canvas if desired. The vertical front, rear and end walls are connected by hinges 14, having vertical legs 15 pivotally engaging said walls to which they are secured from accidental displacement by nuts 16. The vertical legs 15 of each hinge is connected by a horizontal portion 17 extending diagonally across the corners of the crate when the same is set up for use.

18 designates the top of the crate, which in the present instance is covered with canvas 19 and reinforced at its underside with a pair of longitudinal pieces 20, having offsets 21 at their ends which fit into recesses 22 in the upper edges of the end walls. The sides of the recesses 22 prevent lateral displacement of the longitudinal pieces 20, and the shoulders 23 at the ends of the latter abut the inner surfaces of said end walls and reliably prevent the same from collapsing inwardly. The longitudinal pieces 20 are further secured to the end walls when the crate is set up, by screw eyes 24 having rings 25 whereby they may be turned to screw them into and out of the end walls 3 and 4. The rings 25 are loosely connetced to the upper ends of the screws 24, so that they may fold downward against the tops of the end walls when not in use.

26 designates the bottom of the crate which fits against the inner surfaces of the vertical walls and rests upon the oblique portions 17 of the lower hinges 14, which prevent downward displacement of said bottom 26. The bottom 26 is held from accidental upward displacement by turn-buttons 27 pivoted to the lower portions of the front and rear walls. By thus mounting the turn-buttons 27, they may be adjusted to vertical position to register with notches 28 in the longitudinal edges of the bottom 26, to permit said bottom to pass the buttons 27.

When the crate is to be placed in knockdown position, the top and bottom are removed and the vertical walls are folded against each other, as disclosed by Fig. 3. When collapsed the crate occupies but little space and may be shipped at small cost. When the crate is to be set up for use, the end walls fit between the side walls and the hinge members act as braces therefor. When the top and bottom are placed in position all danger of accidental collapse of the crate is avoided and the oblique edges 18" of the top brace the upper hinges by snugly fitting against the diagonal portions thereof.

Having thus described my invention, what I claim and desire to secure by Letters Patent, is:

A collapsible crate consisting of vertical walls, upper and lower hinges connecting said walls, a removable bottom fitting against the vertical sides of said vertical walls and resting upon the lower hinges, a top to close the upper portion of the crate, said top having oblique edges to fit against the upper hinges, longitudinal reinforcing pieces secured to the underside of the top and having offsets to fit into recesses in the upper edges of the end walls, and screw eyes engaging said offsets and the end walls to secure the top from accidental displacement.

In testimony whereof I affix my signature, in the presence of two witnesses.

THOMAS EDWARD BLOYD.

Witnesses:
WILLIAM B. MYERS,
ERNEST E. BUSH.

Copies of this patent may be obtained for five cents each, by addressing the "Commissioner of Patents, Washington, D. C."